United States Patent
Spackman

(10) Patent No.: US 8,572,409 B2
(45) Date of Patent: Oct. 29, 2013

(54) METHOD AND APPARATUS FOR NON-REDUNDANT ENCRYPTED STORAGE

(76) Inventor: Stephen P. Spackman, San Jose, CA (US)

( * ) Notice: Subject to any disclaimer, the term of this patent is extended or adjusted under 35 U.S.C. 154(b) by 1049 days.

(21) Appl. No.: 12/239,518

(22) Filed: Sep. 26, 2008

(65) Prior Publication Data

US 2010/0083003 A1    Apr. 1, 2010

(51) Int. Cl.
*G06F 11/30*    (2006.01)
(52) U.S. Cl.
USPC ............................ 713/193; 711/154; 711/135
(58) Field of Classification Search
USPC ................................. 713/193; 711/154, 135
See application file for complete search history.

(56) References Cited

U.S. PATENT DOCUMENTS

2001/0047481 A1*  11/2001  Inoha et al. ................... 713/193

OTHER PUBLICATIONS

Wang et al. (2007). SEDBRS: A Secure and Efficient Desktop Backup and Recovery System. The First International Symposium on Data, Privacy, and E-Commerce, 2007.*
Preiss, B. (1998). Data Structures and Algorithms with Object-Oriented Design Patterns in Java: Section Double Hashing. Retrieved Mar. 7, 2012 from http://www.brpreiss.com/books/opus5/html/page242.html.*

* cited by examiner

*Primary Examiner* — Brian Shaw

(57) ABSTRACT

For secure non-redundant storage of data, to store a data blocklet (sub-block), one takes a hash of each blocklet. The hash value is used as a key to encrypt the blocklet data. The key is then hashed to encrypt it and the hashed key used in the blocklet index to identify the blocklet. The blocklet index entry also conventionally includes the address of that encrypted blocklet. Unless one has a file representation which is a vector of the hash values, one cannot obtain direct information about the original blocklet from the blocklet index or the blocklet storage. To retrieve data, each original blocklet hash is hashed again to generate the index entry.

3 Claims, 4 Drawing Sheets

METHOD AND APPARATUS FOR NON-REDUNDANT ENCRYPTED STORAGE

FIELD OF THE INVENTION

This invention generally relates to computers, computer storage, and particularly to reduced redundancy (de-duplication) computer data storage.

BACKGROUND

Conventional computer data storage systems such as conventional file systems organize and index pieces of stored data by name or identifier. These conventional systems make no attempt to identify and eliminate repeated pieces of data within the collection of stored files. Depending on the pattern of storage, a conventional file system might contain a thousand copies of the same megabyte of data in a thousand different files. A reduced-redundancy storage system reduces the occurrence of duplicate copies of the same data by partitioning the data it stores into sub-blocks and then detecting and eliminating duplicate sub-blocks. See WILLIAMS, U.S. Pat. No. 5,990,810 and U.S. patent application publication US 2007/0192548A1, published Aug. 16, 2007, inventor WILLIAMS, both incorporated herein by reference in their entirety describing such a system. See also PCT international publication WO 2006/094366, inventor WILLIAMS, published 14 Sep. 2006 and also published international patent application WO 2006/094365, inventor WILLIAMS, published 14 Sep. 2006, both also incorporated herein by reference in their entirety describing other aspects of such systems. This technique is also referred to as "de-duplication technology" in the computer storage field. The goal is to reduce the amount of capacity consumed by file storage. The ultimate storage is typically either on magnetic tape or hard disk, but this of course is not limiting. Typically in such systems as files are written into the system (or alternatively in a subsequent, separate de-duplication step) they are analyzed by a de-duplication engine (processor) and broken into sub-files referred to as sub-blocks or blocklets. Each blocklet is examined by the engine to see if it is unique. If it is, the blocklet is stored to disk and consumes disk or tape capacity. If the blocklet is determined not to be unique that means it has already been stored and one of the two copies may be discarded. After the entire file has been examined, an index record is stored that lists what blocklets or sub-blocks make up the file and how to rebuild the file, that is how to locate them in the storage.

More technically, this approach to data storage reduction systematically substitutes reference pointers in the index for redundant fixed or variable-length blocks or data segments, also referred to as blocklets or sub-blocks, in a specific data set. The more sophisticated version uses variable length data segments. Data de-duplication operates by partitioning the file into the blocklets (sub-blocks) and writing those sub-blocks to a disk or tape. To identify the sub-blocks in a stream, the data de-duplication engine creates a digital signature, also sometimes referred to as a fingerprint, for each sub-block and an index of all the digital signatures for a given storage repository. The index, which can be recreated from the stored sub-blocks, provides a reference list to determine whether sub-blocks already exist in the repository. The index is used to determine which new sub-blocks need to be stored or alternatively which old sub-blocks can be discarded and also which need to be copied during a reproduction operation. When the data de-duplication engine determines that a particular sub-block has been processed (stored) before, instead of storing the sub-block again it merely inserts a pointer to the original sub-block in the "metadata" kept in the index. If the same sub-block shows up multiple times, multiple pointers to it are generated.

There actually are two distinct kinds of access structures, an 'index,' which is used to locate pre-existing copies of blocklets given their signatures (it maps identifies to location), and used on data ingest, and 'recipes,' which specify the particular blocklet lists associated with files or 'blobs' in terms of the blocklet identities and/or locations. The pointers refer to the physical location or address in the magnetic tape or hard disk block storage. (Use of magnetic tape drive or disk drive storage is not limiting; this could be semiconductor-based random access memory storage or other types of electronic storage. Tape or disk is merely more economically per bit stored.) Variable-length sub-block de-duplication technology stores multiple sets of discrete recipe images, each of which represents a different file, but all of the sub-blocks are contained in a common storage pool and share a common index of blocklet signatures. Since use of variable length data segments is well known, it is not further referred to here, but it is understood that it may be used in accordance with the present invention. De-duplication technology is often used to store backup data in large computer systems, but that again is not limiting.

Such a de-duplication system is most advantageous when it allows multiple sources and multiple system presentations to write data into a common de-duplicated storage pool. This has been commercially achieved by Quantum Corp., assignee of this application. Typically access is provided to a common de-duplication storage pool, also known as a "block pool", through multiple presentations that may include any combination of (virtual) disk storage volumes or (virtual) magnetic tape libraries. Because all the presentations access the common storage pool, redundant blocklets or sub-blocks are eliminated across all data sets being written to the system. See Quantum Corp. publication entitled "Data De-duplication Background: A Technical White Paper." Other terminology in this field is the term "BLOB", which refers to "binary large object" which is a finite sequence of zero or more bytes or bits of data which may be contents of a data file or other large piece of data and is represented as a sequence of sub-blocks from a pool of sub-blocks.

Typically the pool of sub-blocks when stored in a data storage system is indexed by the sub-block index. By maintaining this index of the sub-blocks, the storage system determines whether a new sub-block is present in the storage system and if it is, easily determines its location. The storage system then creates a reference to the existing sub-block rather than storing the same sub-block again as pointed out above. Hence two different BLOBs or data files can both refer to the same sub-blocks in the pool. Thereby considerable storage space may be saved. Each sub-block index entry provides information to identify the sub-block thereby distinguishing it from all others and information about the actual location (storage address) of the sub-block within the sub-block pool for retrieval.

Typically the index is referred to very frequently since each new BLOB received must be divided into sub-blocks and many of the sub-blocks looked up in the index. An index may be held in random access memory or on a hard disk although holding it in random access memory access is much quicker since a hard disk is relatively slow to access. Thus the index may be stored either in random access memory or equivalent or on hard disk drive or in magnetic tape memory or a combination thereof.

Hash algorithms are well known in the data storage and cryptographic fields. A hash is a "one-way" mathematical or logical algorithm which provides a fixed length sequence of bits generated by a hash function from input data. Hashes of sub-blocks may be used as unique identifiers of the sub-blocks, i.e., fingerprints, to index and compare sub-blocks. A hash is well known in the field as an algorithm that accepts a finite sequence of bits (data) and generates as output there from a finite sequence of bytes or bits highly dependent on the input sequence. Typically a hash algorithm generates output of a particular fixed length, expressed in the number of bits. Hash algorithms are well known to test efficiently to see if two sequences of data such as blocks or sub-blocks might be identical without having to compare the sequences directly. Cryptographic hashes allow one to conclude, for all practical purposes, that two sub-blocks are identical if their hashes are identical providing that they produce a suitably large number of output bits, according to well-known statistical principles. Thus cryptographic hashes are "strong" hashes in the cryptographic sense. Hence "hash" as used here refers to a type of one-way function which reduces input data to a value of fixed bit length.

Various cryptographic (secure) hashes are well known. The U.S. National Security Agency has established what is referred to as SHA, the Secure Hash Algorithm. Hash algorithms are called secure, that is strong when it is computationally infeasible to find a message that corresponds to a given message digest and it is computationally infeasible to find two different messages that produce the same message digest, and any change to a message including changing even a single bit will within exceedingly high probability result in a completely different message digest. Five algorithms so designated by the National Security Agency are designated SHA-1, SHA-224, SHA-256, SHA-384 and SHA-512. The later four variants are sometimes collectively referred to as SHA-2. SHA-1 produces a message digest that is a hash value that is 160 bits long. The number of bits in the other four algorithms' names denotes the bit length the digest they produce. Other hash algorithms, also a cryptographic hash algorithm, are MD5 and MD4. Note that the security of SHA-1 may have been compromised and as usual in the cryptographic field there is always competition between new cryptographic functions and compromises thereof. These hash functions may be employed in an optional keyed hash mode. Hence the reference here to hash functions is not intended to be limiting to the above described hash functions.

Present FIG. 1, from Williams US 2007/0192548A1, depicts in a block diagram a known system to carry out reduced redundancy storage. This is in the context of typical computer hardware. Disk storage 70 has resident on it a sub-block index digital search tree 78 and associated sub-blocks index hash tables 80. Also provided is a BLOB table 72 and a sub-block pool 74 where the BLOB table is a list of the files and the sub-block pool 74 is the storage for the actual stored sub-blocks. Use of disk 70 here is not limiting. Also provided is a central processing unit 88, typically for instance a processor, which is the de-duplication engine coupled to a network 84. Provided in random access memory 92 are the index entry storage buffers 94, bit filter 96 for processing the index entries, and caches 98 as well as the sub-block index binary digital search tree 92, which is part of element 78, but provided in memory 92 here for faster access. This arrangement is merely illustrative, but a similar arrangement may be used in conjunction with the present invention.

SUMMARY

The present inventor has identified deficiencies with current reduced redundancy storage systems in that they do not provide for data encryption, since encrypted sub-blocks cannot be compared against each other for de-duplication. That means in order to provide de-duplication of encrypted data, the de-duplication engine must be trusted with all the encryption keys used for the data it processes. However, thereby providing the encryption keys compromises security. As well known, encryption typically is carried out in computer systems, typically by software and/or dedicated hardware which encrypts data using a key, which is a number of particular length, using a particular encryption algorithm. The resulting encrypted data may be decrypted using either that key or in some cases a different key. If a different key is used for decryption, this is referred to as asymmetric cipher. If the same key is used for encryption and decryption, it is a symmetric cipher. A large number of both such ciphers are well known.

Hence the present invention is directed to solving the problem of providing encryption in the context of reduced redundancy storage. The goal is to encrypt data which is to be stored in the block pool, that is encrypt the blocklets, also known as sub-blocks. This must be accomplished in a way to make sure that the encryption/decryption keys are also kept secure. In accordance with the invention, a hash value of the blocklet itself is used as the data encryption key to encrypt that same blocklet. This hash value is again subject to a one way function, possibly but without limitation the same hash algorithm, and the resulting value then used as the key in the sub-block index.

A statistical analysis of the present technique (as regards whether collisions are or are not 'impossible' for practical purposes) suggests that either the hash algorithm used should be quite wide (i.e. many bits of output on the order of twice the number of bits required for an equivalent guarantee in the unmodified deduplication scheme in the prior art) or a different function (specifically, one with the additional property of being a permutation over the input hash values) would be desirable for the second hash. One could also use an asymmetric cypher as the outer 'hash' algorithm and get a structure that is functionally similar but possesses a 'master key' to decrypt the entire index and block pool if that were desirable.

In the conventional method only a single hash algorithm is applied to the block and the resulting hash value is used as a digital signature and used as the key in the index. In that case the blocklet itself is not encrypted. In the present case, a digital signature of the blocklet is used as the key for encryption of the blocklet and a hash value of the key is stored in the index to identify the blocklet. Thus not only is each blocklet, that is the entire block pool, encrypted block by block, but also the index data stored in the sub-block index is also effectively encrypted. Since the hash algorithm(s) here is cryptographic, that is relatively strong or secure as described above, it is impossible to obtain any direct information about the actual stored blocklets, that is their plain text or unencrypted version, either from the blocklet index which contains only the, e.g., double hashed value of the blocklet or from the sub-block pool storage which contains only encrypted blocklets. Note that both the index and the block pool here are altered compared to those in the prior art.

For further security, the hash algorithm(s) and/or the one-way function may be a keyed type as known in the field, which is more secure than ordinary hashes or one-way functions. The specific way in which it is more secure is if a non-keyed approach is taken, then anyone having a copy of a blocklet can hash it according to the storage procedure described and then determine if the index contains a copy; this is a form of known-plaintext attack. If the hashes are keyed, then there is an additional requirement of knowing the master key to the index. Alternatively, distinct master keys can be used for different administrative groups storing data in the same blockpool (at the cost of their data not deduplicating against each other, but only against data from the same domain). These are not major increments in security, but they do decrease the attractiveness of an attack whereby the attacker hunts for incriminating data given a portfolio of candidates. Note that the variant of using an asymmetric cypher is in fact a generalisation of the keyed hash.

To put this another way, a data file, the contents of which are a BLOB as referred to above, is represented by a data structure that contains the original hash values of the blocklets that compose the file, and each hash value is passed through the chosen one-way or hash algorithm to generate the sub-block index entry needed to locate in the block storage the encrypted blocklet. To retrieve the stored file later, each original hash (which must be available to the entity doing the retrieval) is used to retrieve each corresponding blocklet by using it in this way to generate the index entry. Once the encrypted blocklet is located using that index entry, the decryption key (which is also the original hash value of the blocklet) is then used to decrypt the data back to its original (plain text) form which in turn is used to reassemble the file from the various decrypted sub-blocks. Thus here the decryption is applied on a blocklet by blocklet basis. The security of the storage then resides in security of the (relatively short) 'recipe,' the list of hashes, rather than the much bulkier blocklet bodies, the latter being deduplicated into the blocklet store. Of course this could also be performed at the block level, and use of the terms blocklet or sub-block here is merely illustrative.

DETAILED DESCRIPTION

In accordance with this invention, to store a blocklet, also known as a sub-block and which is an example of a piece of data of the digital type routinely stored in computer systems and storage systems, in one embodiment a hash value of the blocklet itself is used as the data encryption key to encrypt the blocklet. The encrypted blocklet is then stored. This provides security. The hash value (which is also the encryption key) is then passed again through the hash or other cryptographically secure one-way algorithm thereby effectively securing (encrypting) it and then that hash of the hash of the blocklet is stored in the blocklet index, also referred to as a sub-block index and illustrated for instance in FIG. 1 as elements 80 and 92.

To express this process in logical notation, let the sub-block data be indicated by B. Then the hash of B is expressed as [B] and the image of [B] under the second hash or the one-way function is expressed as [[B]]. So [B] denotes in one embodiment a secure cryptographic hash value of the data sub-block B. Let C=B*K denote the encrypted result C of encrypting sub-block B with the key K, where in this instance, key K=[B]. Let C/K be the result of decrypting the enciphered sub-block C with the key K.

In the prior art the block pool Bpool can be viewed as a finite map (association or correspondence) Bpool such that [B]→B, thereby mapping the hashes of previously stored data sub-blocks to the contents of those blocks. Files stored within the block pool are represented by vectors of hash values. As pointed out above, "blockpool" is merely terminology for a system of pooled memory of the type used in reduced redundancy storage.

Figure 3:
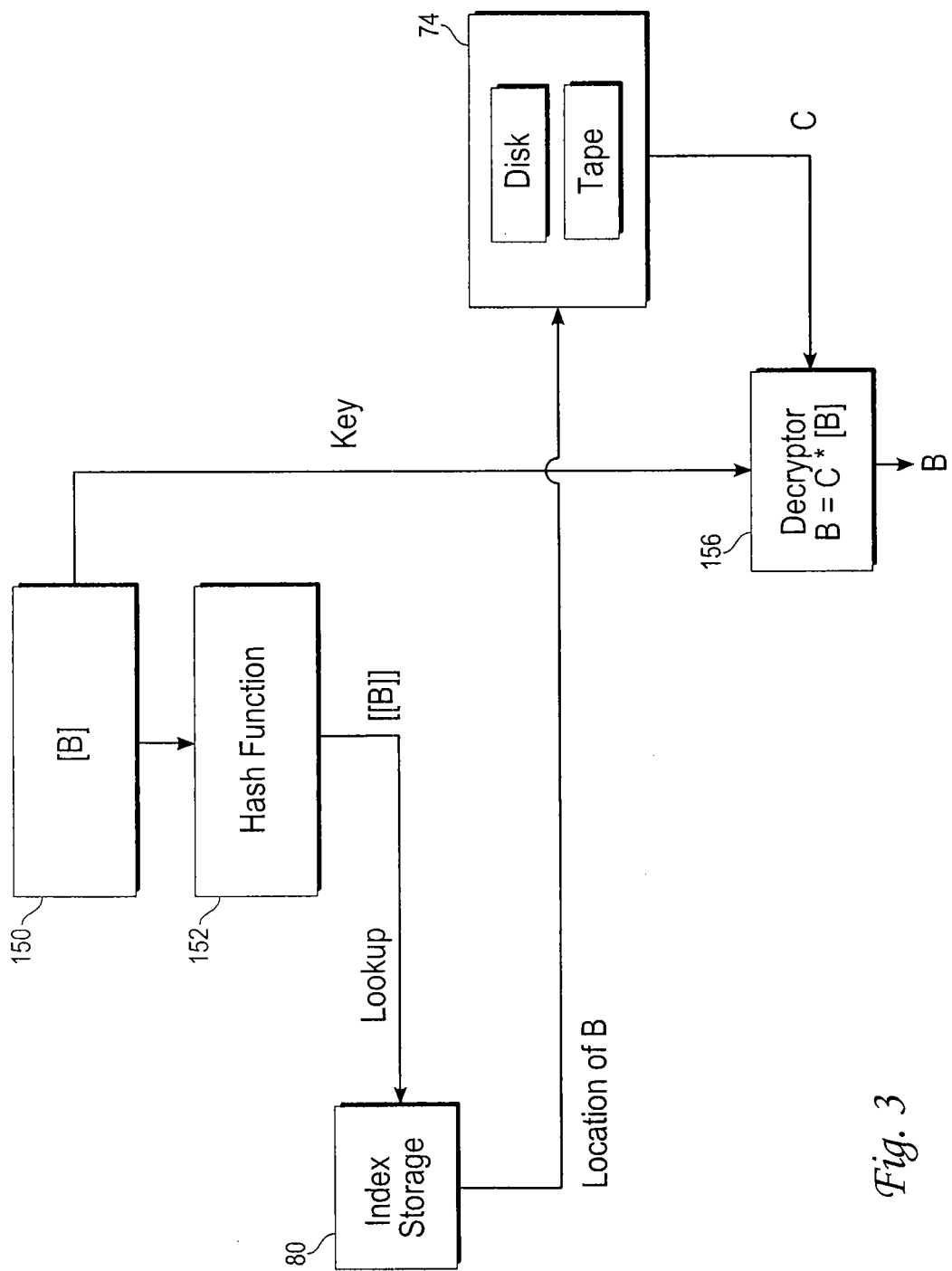
FIG. 3 shows a flow chart and hardware block diagram for retrieving a block from storage in accordance with the invention, the block having been stored using the FIG. 2 method.

Generally then as shown in FIG. 3, the sub-blocks are listed in the hash table 80 (index) as a list of entries with a hash value for each entry and the corresponding physical or address location, with one entry per stored sub-block (blocklet).

In accordance with an embodiment of the invention, one replaces or combines the conventional mapping of block pool Bpool with a different finite map Cpool such that [[B]]→B*[B]. This finite map of Cpool can be represented using the same methods and technology as described above for the prior art type blockpool but further has properties which render it secure. Various adjustments may be made in, e.g., the choice of hash functions to maintain desirable statistical properties of the hashes. These properties are that first, anyone in possession of a file representation (a vector of the hash values of the file) can obtain for any hash code [B], [[B]] and thus B*[B] and thus B*[B]/[B]=B. Second, absent having the value [B] no direct information about the original sub-block B can be extracted either from the sub-block index which contains only values of the form [[B]] from which practically given the security of the hash function, the value [B] cannot be reconstructed, or from the actual block store (sub-block pool) 74 shown in FIG. 3. The actual block store contains values of the form B*[B] from which similarly the original sub-block B cannot be obtained. This provides security due to the encryption effectively of both the sub-block B data and the sub-block index entries.

As pointed out above, for additional security the hash function may itself be a keyed cryptographic type hash function as described above.

Figure 2:
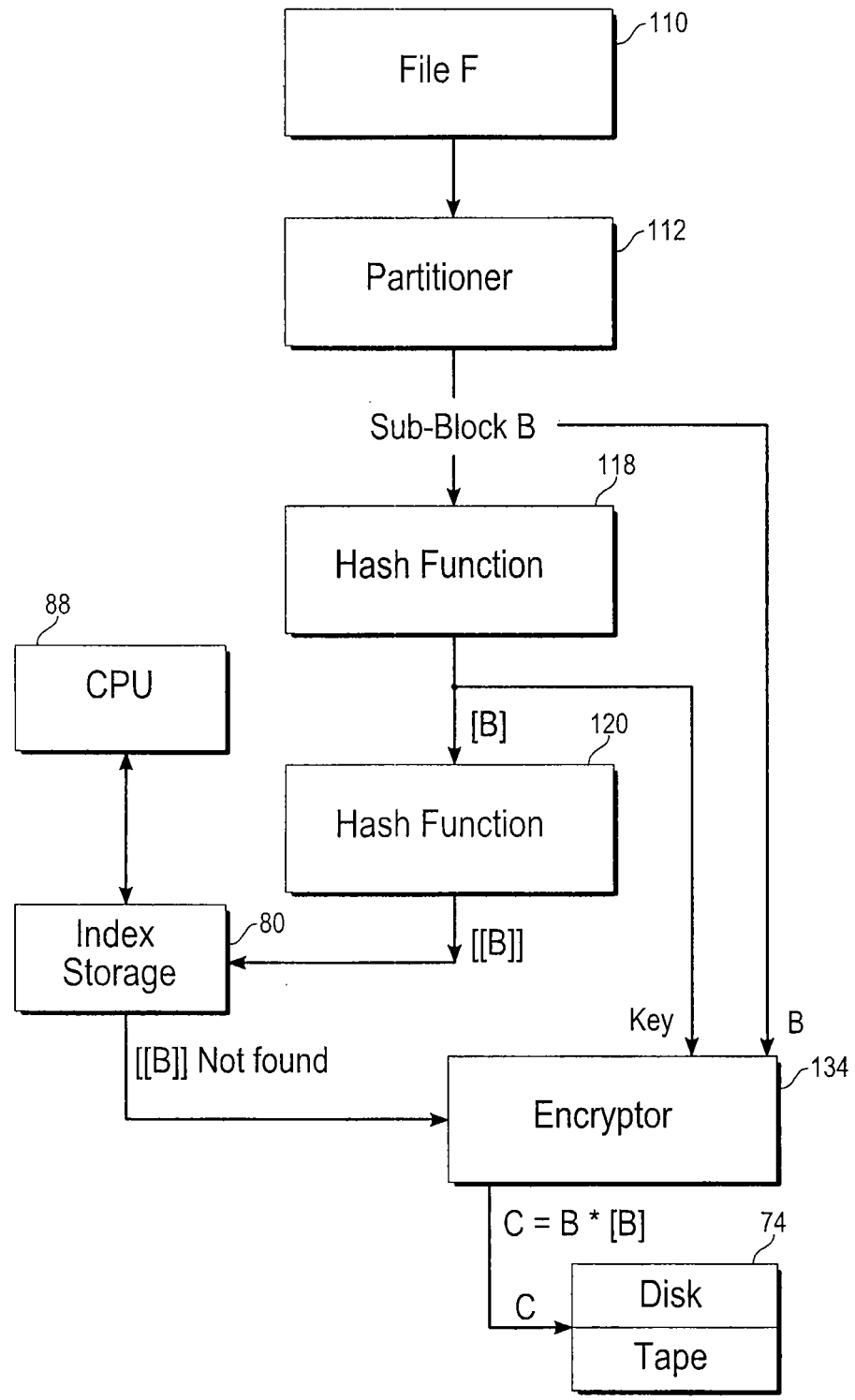
FIG. 2 shows a combination flow chart and block diagram for carrying out storage of data in accordance with the present invention.

The above process is illustrated with further detail in FIG. 2 which shows in a combination flow chart and block diagram how a particular sub-block B is stored. (This is a modification to the above described conventional reduced redundancy data storage techniques and emphasizes the differences over same. Aspects which are similar to the conventional process are generally not shown here as being routine.) First in FIG. 2, one begins with the contents of a file F (or a BLOB) stored in memory 110 such as on disk or tape or random access memory. F need not be an individual file, but may be a compilation of files or a part of a file, thus reference to file F is an exemplary reference to a piece of digital data. Next conventionally, file F is partitioned at partitioner 112 into sub-blocks or blocklets B; these may conventionally be of fixed or variable length. This partitioning at element 112 is routine in the field.

Next, one applies a predetermined hash function 118 to the first sub-block B to each sub-block B and the resulting hash value (code) is here designated [B]. Again such hashing is routinely used in the field as pointed out above to obtain a fingerprint or identifier for each sub-block. Next in accordance with the invention, the hash value expressed as [B] of block B is again subject to the same (or perhaps a different) hash function at 120 resulting in [[B]] resulting in a hash of a hash of the sub-block B. More generally, the value [B] is subject to a one-way function, not necessarily a second hash. After [[B]] (or the one-way function of [B]) is obtained, this value is conventionally compared using processor 88 to each of the index entries earlier stored in the index store 80 of FIG. 1.

Figure 1:
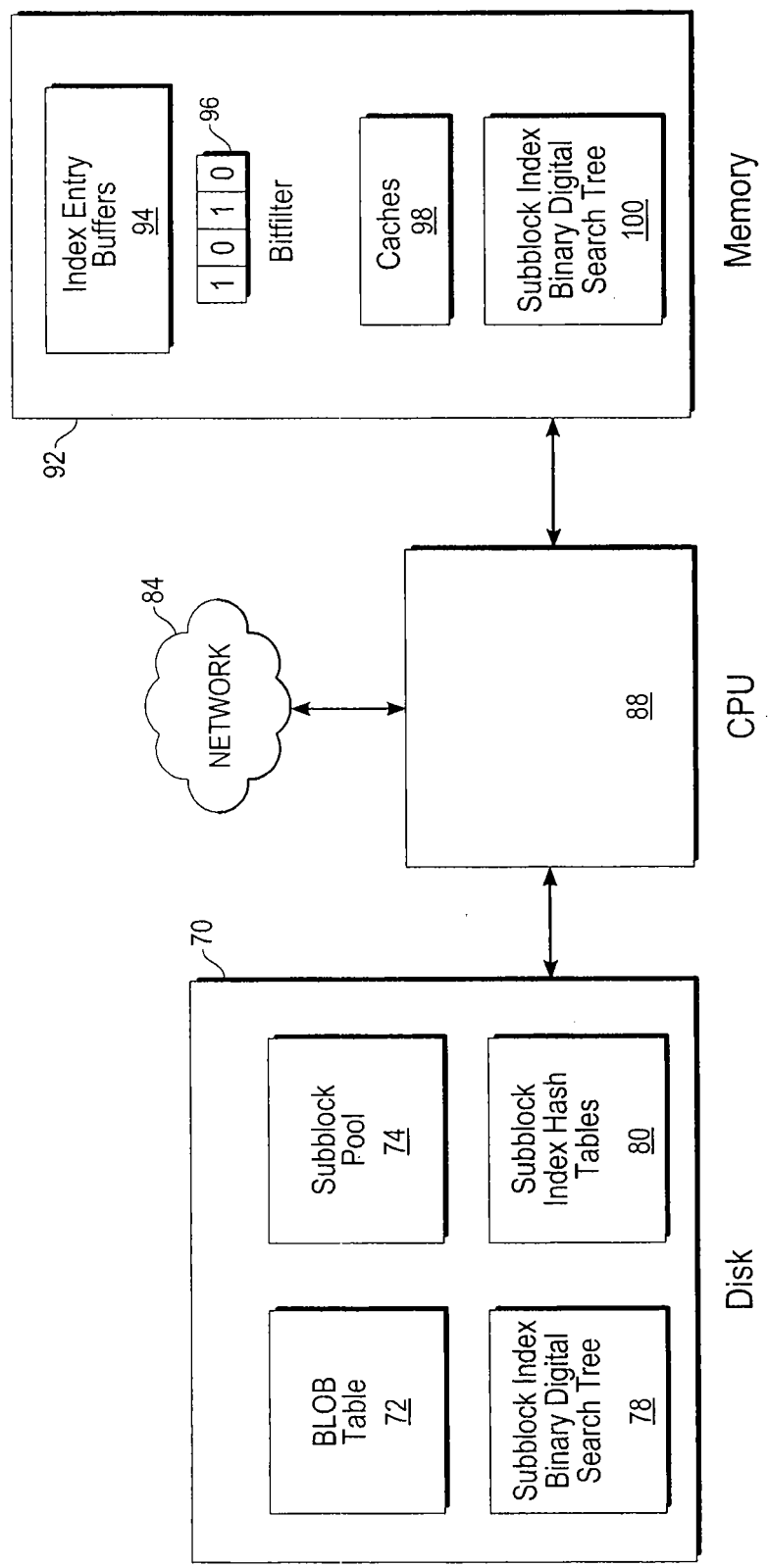
FIG. 1 shows in the prior art the structure of a reduced redundancy storage system; this system is also suitable for use in conjunction with the present invention.

In the case where [[B]] is not found in the index store 80, this indicates the presence of a new sub-block which must be stored in the sub-block pool storage 74 of FIG. 1. In that case, conventionally the index 80 is updated with a location of the new sub-block; however, again the index entry includes only the double hashed sub-block data value, not the prior art single hash version, thus effectively encrypting the single hash which is to be used as the encryption key. At this point, the key which is the single hash [B] is applied to an encryptor function 134 which is for instance any symmetric encryption (cipher) function. The choice of cipher is partly dependent on processing speed and storage resources available. Note that a sub-block may conventionally be compressed prior to encryption.

The resulting encrypted value C of the block encrypted using the key which is designated as above C=B*[B] is then conventionally stored to disk (or tape or solid state memory) in encrypted form in the block pool storage 74. As pointed out above, both the encrypted sub-block C is secure since it is encrypted and its index entry [[B]] is secure since it is a hashed version of the key [B], thus being effectively encrypted itself. In either case even if an attacker has access to the index store 80 and the block store 74, there is no possibility of him extracting from either the actual block B. Also of course the digital signature functions 118, 120 and encryption functions 134 can be further secured conventionally. The process of FIG. 2 may be carried out in hardware, software, or a combination thereof as is conventional in the field. Each individual function or block of FIG. 2 is conventional and can be carried out in computer hardware or software or a combination thereof. For instance, dedicated encryption integrated circuits are available which encrypt faster than does software.

FIG. 3 shows the complementary (to FIG. 2) process and associated apparatus for accessing a previously stored sub-block by retrieving it from the block pool storage 74. The retrieving entity here knows B and/or [B]. The retrieving entity knows [B], typically because the system earlier stored an encrypted vector <[B0], [B1], . . . , [Bn]>*K somewhere else, under a key K that the authorized user knows or has access to (possibly through the agency of a key management component). Each original hash value [B] is then provided in memory location 150. Then one applies the hash or one-way function 152 (where function 152 may be effectively identical to hash function 120) to [B] to yield [[B]]. The value [[B]] then provides the relevant index entry for look up of B in the index store 80 to determine the location of B in the block pool 74. The location (address) is then used to access the block pool storage 80 to output the encrypted sub-block C. Then using the key which is [B] and a decryptor function 156 complementary to the encryptor of FIG. 2, one decrypts the encrypted sub-block C and outputs the result B. This process of FIG. 2 is repeated for each sub-block B in file F (or in the BLOB).

The present system is not restricted to the index being the only means of locating the blocklets being retrieved. For example, if the retrieval 'recipe' contained the locations of the encrypted blocklets as well as the hashes, this might still be acceptable, since the recipes themselves must be stored encrypted.

Building a system in accordance with the invention would be routine to one of ordinary skill in the art, in light of this disclosure, and moreover coding any necessary software (or firmware) would also be routine given this description. Suitable computer languages for the software would be C or C++ but not so limited. This software or firmware (computer program) typically executes on the CPU (processor) 88 in the system of FIGS. 1 and 2, and typically is stored on a computer readable medium as a set of coded instructions.

Figure 4:
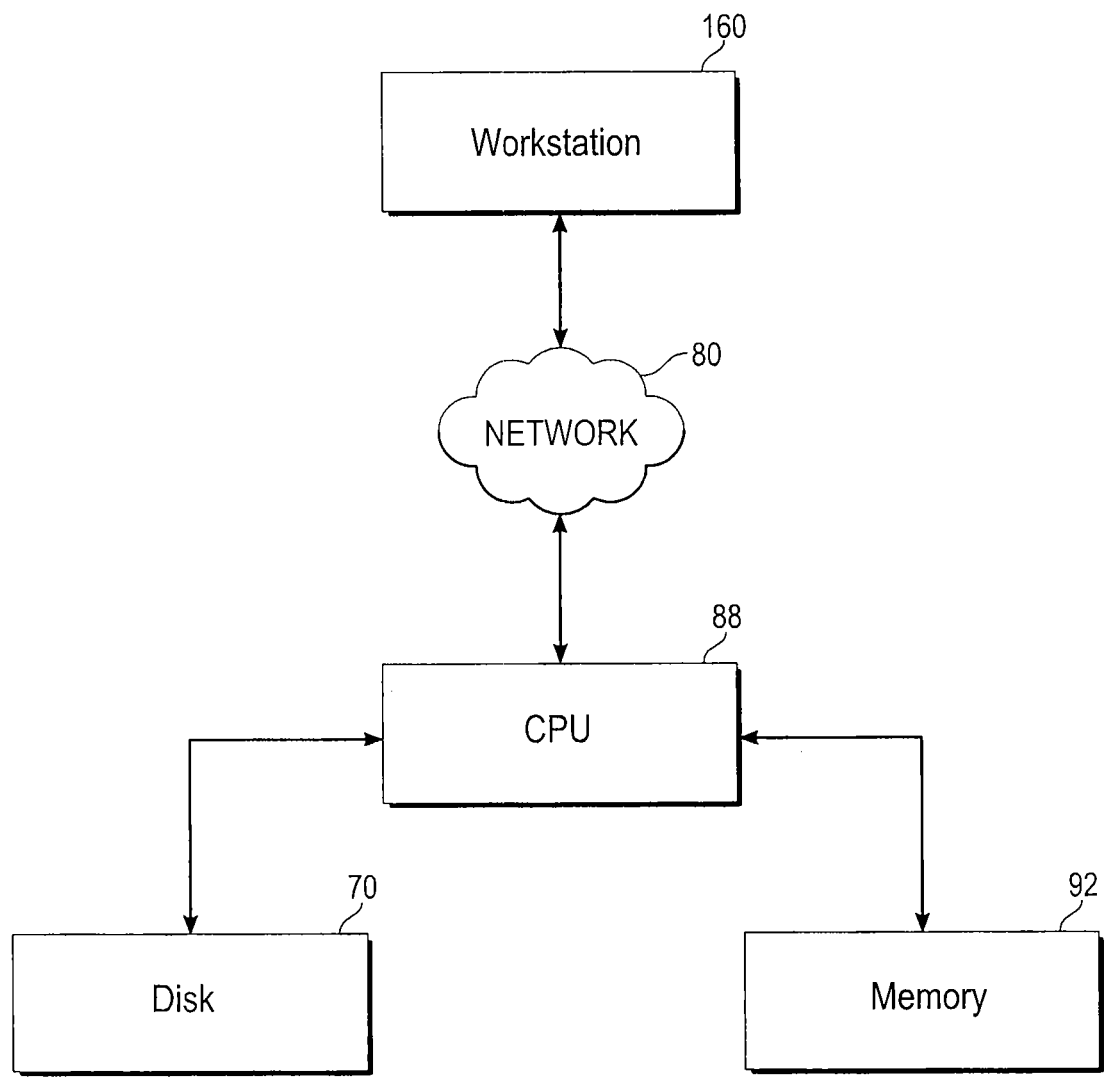
FIG. 4 shows a storage system including the present reduced redundancy storage system.

FIG. 4 shows an otherwise conventional networked computer system including the present reduced redundancy storage system and so includes elements similar to those of FIG. 1 including the disk storage 70, engine 88, and memory 92 connected via network 84 to a conventional computer or workstation 160; it is to be appreciated that several such computers 160 may be so connected to share the reduced redundancy storage.

This disclosure is illustrative and not limiting. Further modifications and improvements will be apparent to one skilled in the art in light of this disclosure and are intended to fall within the scope of the appended claims.

I claim:
1. A method, comprising:
computing a first hash by applying a first hash function to a sub-block produced by a data de-duplication system, computing a second different hash by applying a second, different hash function to the first hash; and upon determining that the second hash is not located in an index associated with the data de-duplication system, where the index stores second hash values computed by applying the second, different hash function to sub-blocks processed by the data de-duplication system: producing an encrypted sub-block by applying an encryption function to the sub-block, where the encryption function uses the first hash as an encryption key; storing the encrypted sub-block in a data store maintained by the data de-duplication system; storing, in the index, the second hash value and a location in the data store where the encrypted sub-block is stored; accessing a sub-block stored in the data store by: computing a candidate hash value by applying the second hash function to a received hash value; and upon determining that the candidate hash value appears in the index: retrieving an encrypted sub-block associated with the candidate hash value; and producing a decrypted sub-block by applying a decryption function to the encrypted sub-block, where the decryption function employs a value, other than the received hash value, as a decryption key.

2. The method of claim 1, where the data store is a hard disk drive or magnetic tape drive or solid state memory.

3. The method of claim 1, where the index is stored in random access memory.

* * * * *